United States Patent
Tsuneyoshi

(10) Patent No.: US 9,754,748 B2
(45) Date of Patent: Sep. 5, 2017

(54) POWER GENERATION SWITCH

(71) Applicant: Nobutaka Tsuneyoshi, Tokyo (JP)

(72) Inventor: Nobutaka Tsuneyoshi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/134,571

(22) Filed: Apr. 21, 2016

(65) Prior Publication Data

US 2016/0314923 A1  Oct. 27, 2016

(30) Foreign Application Priority Data

Apr. 24, 2015 (JP) ................. 2015-089037

(51) Int. Cl.
*H01H 9/00* (2006.01)
*H01H 50/36* (2006.01)
*H01H 9/02* (2006.01)
*H01H 23/04* (2006.01)
*H01H 23/08* (2006.01)
*H01H 23/16* (2006.01)
(Continued)

(52) U.S. Cl.
CPC .......... *H01H 50/36* (2013.01); *H01H 9/0271* (2013.01); *H01H 23/04* (2013.01); *H01H 23/08* (2013.01); *H01H 23/16* (2013.01); *H01H 50/54* (2013.01); *H02K 7/1876* (2013.01); *H02K 35/02* (2013.01); *H01H 9/168* (2013.01); *H01H 2239/076* (2013.01); *H01H 2300/03* (2013.01); *Y02B 70/3241* (2013.01); *Y02B 90/224* (2013.01); *Y04S 20/14* (2013.01); *Y04S 20/227* (2013.01)

(58) Field of Classification Search
CPC ....................................... H02K 35/02
USPC ..................... 310/12.12, 15; 290/8
See application file for complete search history.

(56) References Cited

U.S. PATENT DOCUMENTS 2,832,902 A * 4/1958 Drescher ................. F41A 19/61
 310/15
8,228,151 B2 * 7/2012 Schmidt ................. H02K 35/04
 310/12.12

(Continued)

FOREIGN PATENT DOCUMENTS

EP 2747111 6/2014
JP 2005-102413 4/2005

OTHER PUBLICATIONS

Extended European search report dated Sep. 19, 2016.

*Primary Examiner* — Alexander Talpalatski
(74) *Attorney, Agent, or Firm* — Ipusa, PLLC

(57) ABSTRACT

A power generation switch comprising: a case; a core, a coil being wound around the core; a magnet magnetically connected with the core; a yoke in which the magnet is disposed; an elastic element that supports the yoke and elastically deforms so as to deviate a position of the magnet from the core; a switch element that is operated to be moved; and a yoke driving mechanism that moves the yoke so that upon an engagement of the switch element and the yoke being released, the yoke moves between a first position and a second position due to elastic force of the elastic element, wherein first magnetic flux is generated by the core and the magnet when the yoke is at the first position and second magnetic flux different from the first magnetic flux is generated by the core and the magnet when the yoke is at the second position.

2 Claims, 17 Drawing Sheets

(51) Int. Cl.
*H02K 35/02* (2006.01)
*H02K 7/18* (2006.01)
*H01H 50/54* (2006.01)
H01H 9/16 (2006.01)

(56) References Cited

U.S. PATENT DOCUMENTS

| | | | |
|---|---|---|---|
| 9,013,084 B2* | 4/2015 | Ruff | E04B 1/21 |
| | | | 310/12.12 |
| 9,240,267 B2* | 1/2016 | Nagahara | H02K 35/02 |
| 9,324,523 B2* | 4/2016 | Matsumoto | H02K 7/1853 |
| 2008/0315595 A1 | 12/2008 | Bataille et al. | |
| 2013/0093540 A1 | 4/2013 | Ruff | |
| 2014/0265640 A1 | 9/2014 | Ruff | |
| 2014/0285296 A1* | 9/2014 | Nagahara | H01F 7/0231 |
| | | | 335/302 |
| 2015/0279598 A1* | 10/2015 | Matsumoto | H02K 7/1853 |
| | | | 335/205 |

\* cited by examiner

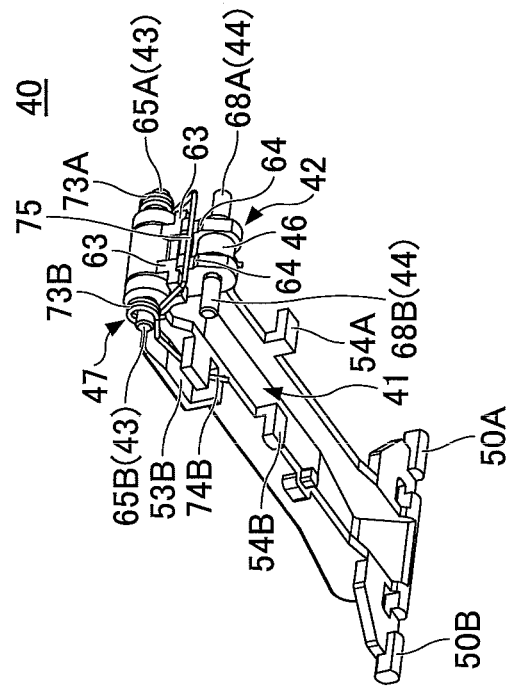
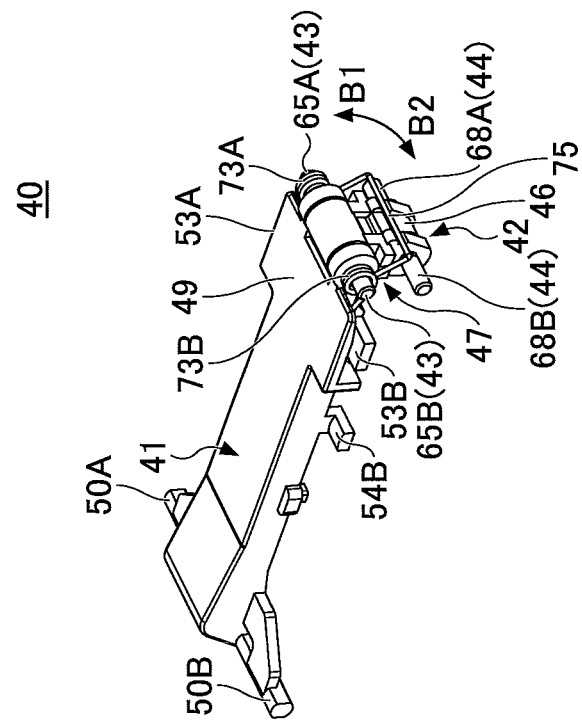

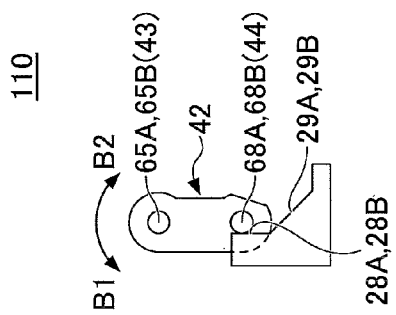
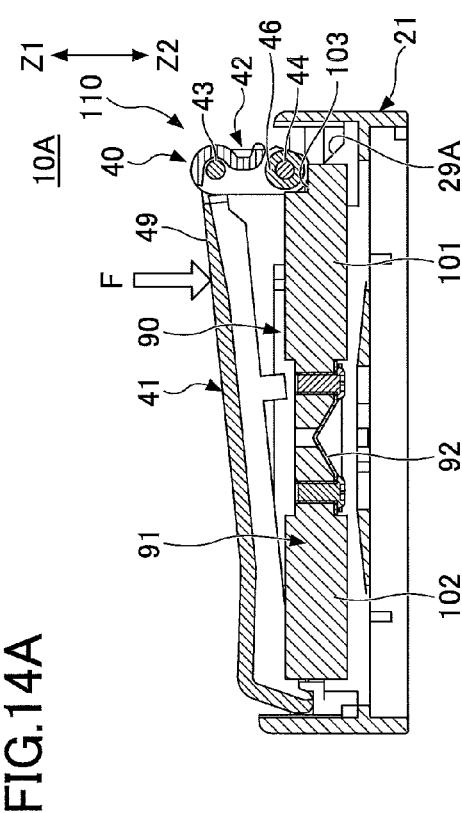
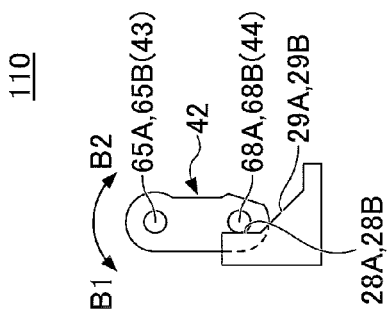
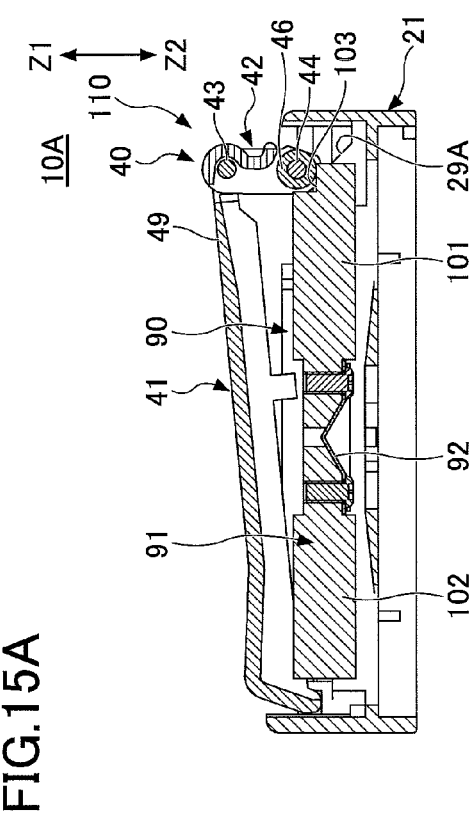

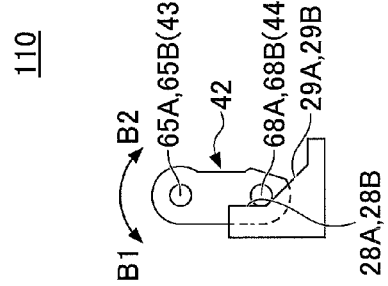
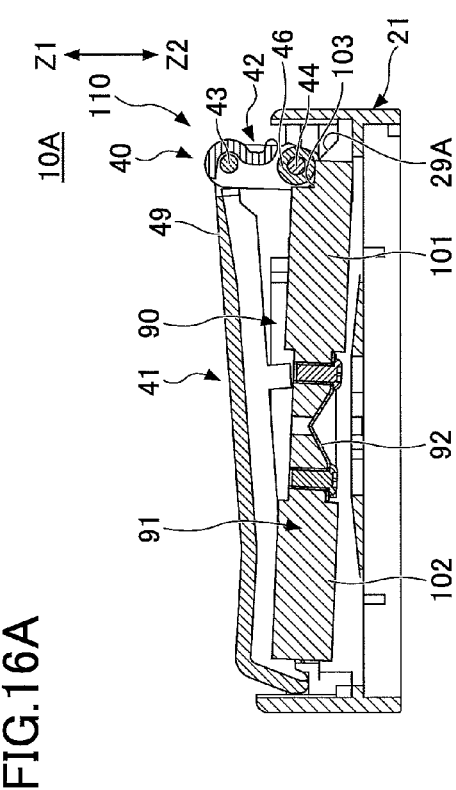
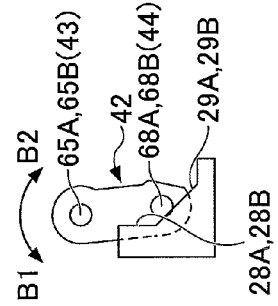
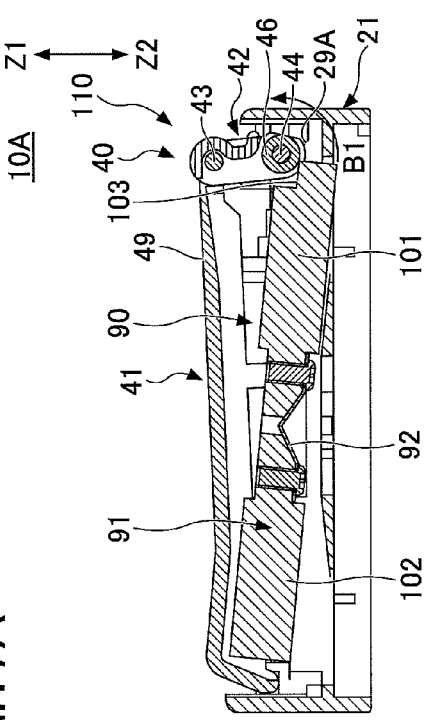

POWER GENERATION SWITCH

CROSS-REFERENCE TO RELATED APPLICATIONS

This patent application is based upon and claims the benefit of priority of Japanese Patent Application No. 2015-089037 filed on Apr. 24, 2015, the entire contents of which are incorporated herein by reference.

BACKGROUND OF THE INVENTION

1. Field of the Invention

The present disclosure relates to power generation switches.

2. Description of the Related Art

For example, a wireless switch is known, which is provided for turning on/off an electric apparatus such as lighting equipment. The wireless switch can be held in hand, and it is more convenient in comparison to a fixed switch disposed on a wall, and the like.

A dry battery may be used for powering the wireless switch. However, the dry battery needs to be replaced and the replacement may bother a user. Therefore, it is proposed that a power generation device is disposed in the wireless switch so as to improve usability of the wireless switch (see Patent Document 1).

Conventionally, a power generation switch as described in Patent Document 1 is known as a power generation switch installed in miniature electronic apparatuses, which generates power by rotating a disk-shaped magnet in a coil to change magnetic flux passing through the coil.

In the power generation switch, the induced electromotive force is generated by instantaneously changing the magnetic flux in the coil. A shaft coupled to the coil needs to be rotated at a high speed to rotate the magnet in the coil accordingly in order to generate stable induced electromotive force in the power generation switch of Patent Document 1.

However, it is difficult to obtain the stable induced electromotive force when the configuration of the power generation switch is applied to a common switch because operating power is uneven on user-by-user basis. Also, the user operates the switch with his/her fingers. It is difficult to rotate the shaft at the high speed so as to generate the induced electromotive force with only power of fingers. Further, in a case where the power generation switch rotates the magnet in a plurality of coils, a size of the power generation switch may be increased.

RELATED ART DOCUMENT

Patent Document

[Patent Document 1]: Japanese Laid-open Patent Publication No. 2005-102413

SUMMARY OF THE INVENTION

An object of disclosure of the present technology is to provide a power generation switch which can be miniaturized and perform stable power generation.

According to one embodiment of the present invention, there is provided a power generation switch comprising: a case; a core, a coil being wound around the core; a magnet magnetically connected with the core; a yoke in which the magnet is disposed; an elastic element that supports the yoke and elastically deforms so as to deviate a position of the magnet from the core; a switch element that is operated to be moved; and a yoke driving mechanism that moves the yoke so that upon an engagement of the switch element and the yoke being released, the yoke moves between a first position and a second position due to elastic force of the elastic element, wherein first magnetic flux is generated by the core and the magnet when the yoke is at the first position and second magnetic flux different from the first magnetic flux is generated by the core and the magnet when the yoke is at the second position.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7A is a perspective view of a switch unit of the power generation switch.

FIG. 7B is another perspective view of the switch unit of the power generation switch.

FIG. 14A is a cross sectional view of the power generation switch for illustrating operations thereof.

FIG. 14B is an enlarged view of an operational element in FIG. 14A.

FIG. 15A is another cross sectional view of the power generation switch for illustrating operations thereof.

FIG. 15B is an enlarged view of an operational element in FIG. 15A.

FIG. 16A is another cross sectional view of the power generation switch for illustrating operations thereof.

FIG. 16B is an enlarged view of an operational element in FIG. 16A.

FIG. 17A is another cross sectional view of the power generation switch for illustrating operations thereof.

FIG. 17B is an enlarged view of an operational element in FIG. 17A.

DETAILED DESCRIPTION OF THE PREFERRED EMBODIMENTS

Figure 1:
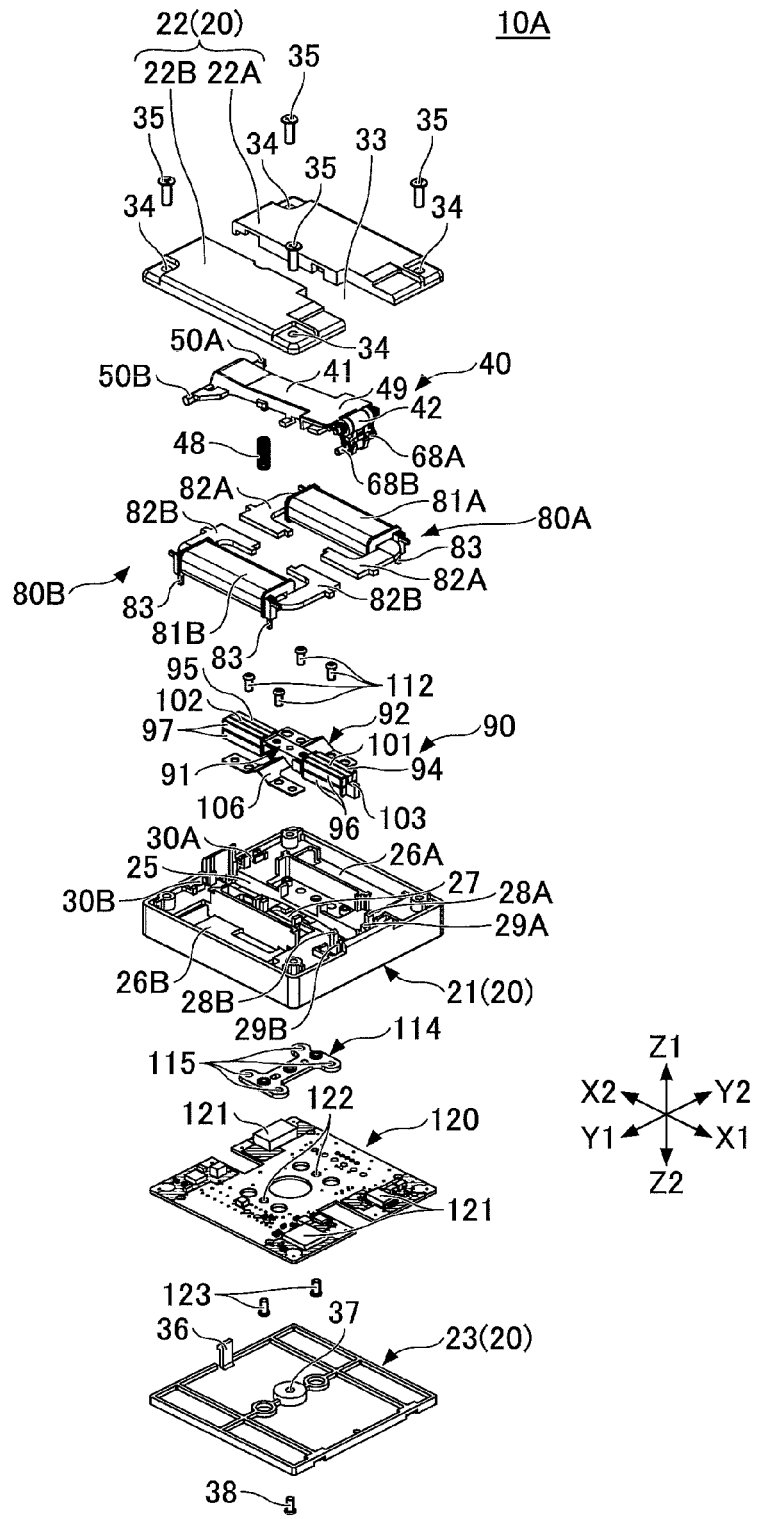
FIG. 1 is an exploded perspective view of a power generation switch.

In the following, embodiments will be described with reference to accompanying drawings as non-limiting examples.

Additionally, in the embodiments and drawings, identical reference numerals will be applied to elements or the like that have substantially similar functions and configurations to those in another embodiment or another drawing, and descriptions thereof may be omitted. Also, the drawings are not for illustrating relative ratio between elements or assemblies unless otherwise indicated. Therefore, a specific size may be determined by one skilled in the art taking account of non-limiting examples described below.

Also, the embodiments described below are non-limiting examples, where features disclosed in the embodiments or combinations thereof are not always essential to the present invention.

Figure 2:
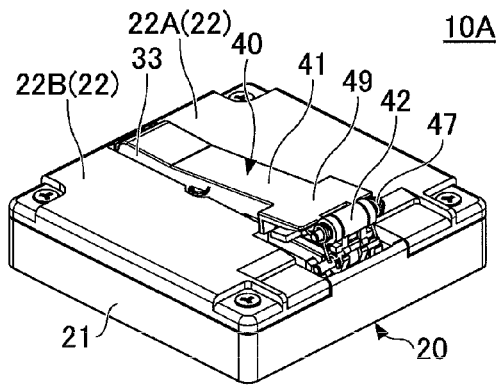
FIG. 2 is a perspective view of the power generation switch of the first embodiment.

FIG. 1-FIG. 3 are diagrams illustrating a power generation switch of an embodiment.

Figure 3A:
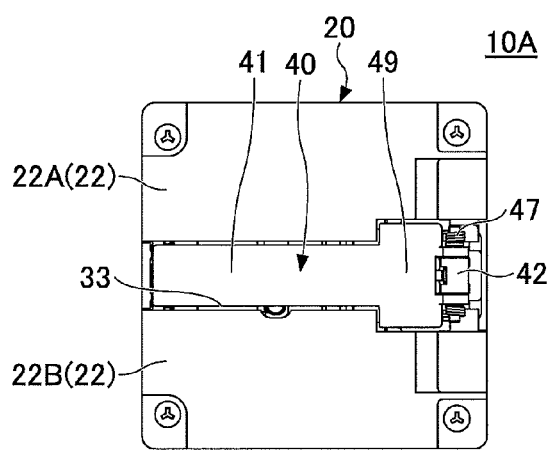
FIG. 3A is a plane view of the power generation switch.
Figure 3C:
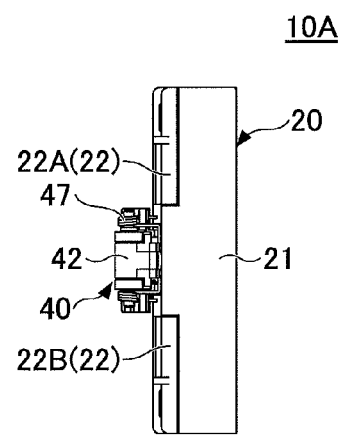
FIG. 3C is a right side view of the power generation switch.
Figure 3B:
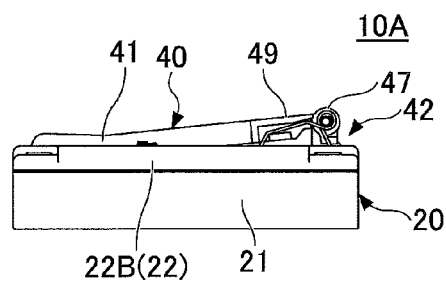
FIG. 3B is a front view of the power generation switch.

FIG. 1 is an exploded perspective view of the power generation switch 10A, and FIG. 2 is a perspective view of the power generation switch 10A. FIG. 3A is a plane view of the power generation switch 10A, FIG. 3B is a front view of the power generation switch 10A and FIG. 3C is a right side view of the power generation switch 10A.

The power generation switch 10A includes a case 20, a switch unit 40, coil units 80A and 80B, a magnet unit 90, a yoke driving mechanism 110 and a circuit substrate (substrate) 120.

The power generation switch 10A performs power generation using the coil units 80A and 80B and the magnet unit 90 when the switch unit 40 is operated, and the power generation switch 10A performs communication through the substrate 120 using the generated power. In the following, a configuration of the power generation switch 10A will be described.

The case 20 is a resin molded part that includes a main boy 21, a top cover 22, and a bottom cover 23.

Figure 6:
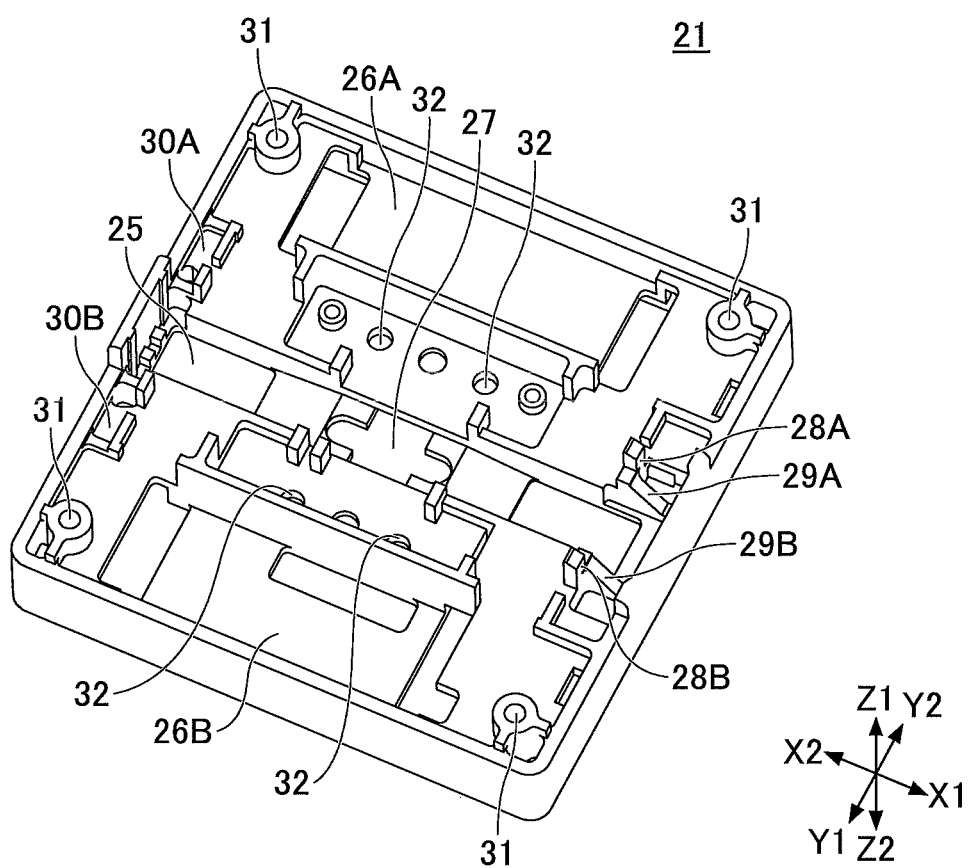
FIG. 6 is a perspective view of a main body of a case of the power generation switch.

As shown in an enlarged view of FIG. 6, the main body 21 of the case 20 includes a switch unit mounting part 25, coil unit mounting parts 26A and 26B, a magnet unit mounting part 27, erecting walls 28A and 28B, slanted walls 29A and 29B (constituting a part of the yoke driving mechanism 110).

Shaft receiving parts 30A and 30B are formed at both sides of one end (an end in a direction of an arrow X2 shown in Figs) of the switch unit mounting part 25. Also, the erecting walls 28A and 28B and the slanted walls 29A and 29B are formed at another end (an end in a direction of an arrow X1 shown in Figs) of the switch unit mounting part 25. Also, screw holes 31 are formed at four corners of the main body 21.

Figure 4:
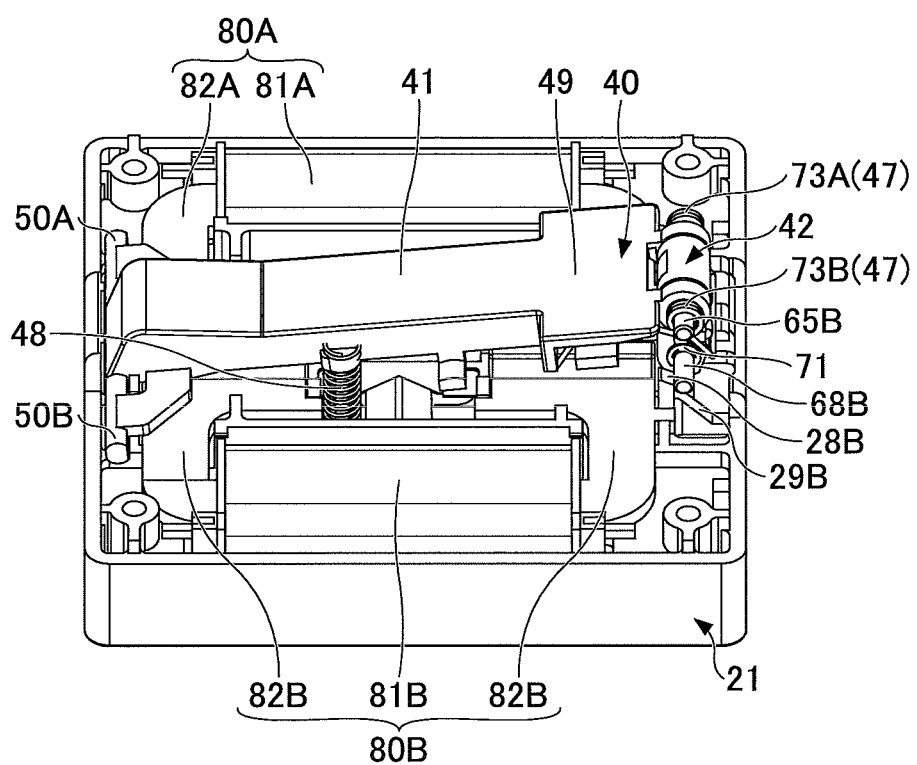
FIG. 4 is a perspective view of the power generation switch, where a top cover thereof is removed.
Figure 5:
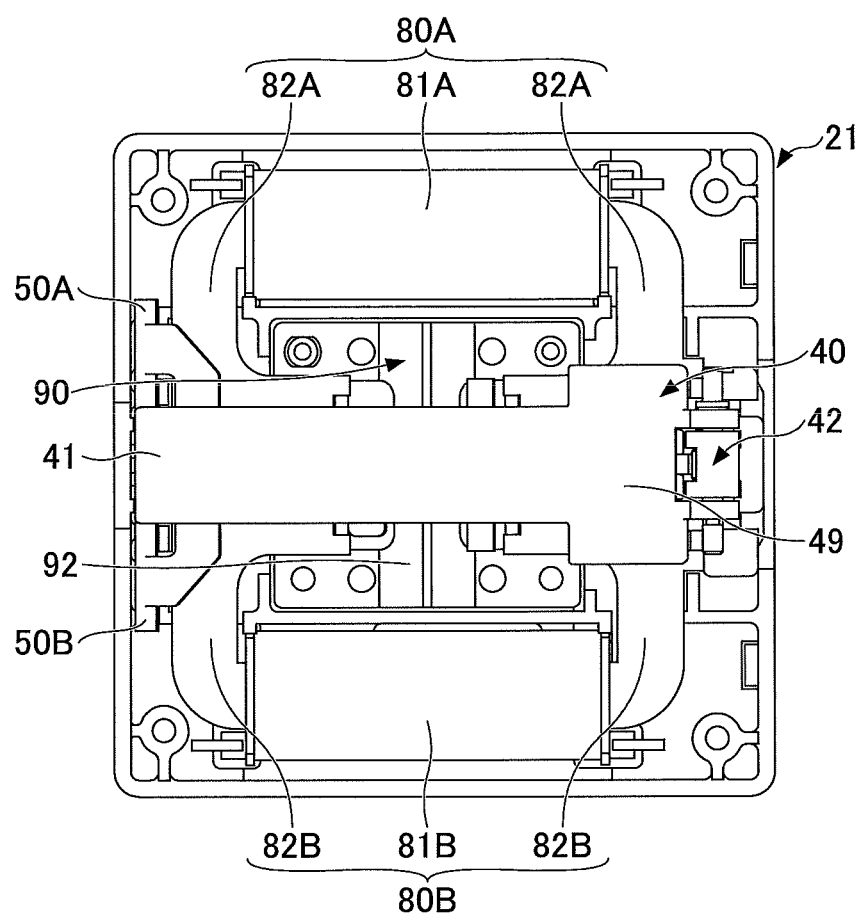
FIG. 5 is a plane view of the power generation switch, where a top cover thereof is removed.

FIG. 4 and FIG. 5 are diagrams illustrating the main body 21 including the switch unit 40, the coil units 80A and 80B, the magnet unit 90, the yoke driving mechanism 110, and the like.

The switch unit 40 is mounted on the switch unit mounting part 25. The coil unit 80A is mounted on the coil unit mounting part 26A and the coil unit 80B is mounted on the coil unit mounting part 26B. The magnet unit 90 is mounted on the magnet unit mounting part 27.

The top cover 22 is formed by a pair of half bodies 22A and 22B. Through holes 34 are formed in the half bodies 22A and 22B. Screws 35 are inserted in the through holes 34 to be screwed into screw holes 31 formed on the main body 21, thereby fixing the half bodies 22A and 22B at the main body 21 of the case 20.

An arm space 33 is formed between the half bodies 22A and 22B (at a center portion of the top cover 22) when the half bodies 22A and 22B are fixed at the main body 21 of the case 20. The switch unit 40 is mounted in the arm space 33.

The bottom cover 23 is fixed at a back surface of the main body 21 of the case 20 after a base element 114 and a substrate 120 are mounted on the back surface of the main body 21.

The base element 114 and the magnet unit 90 are fixed at the main body 21 with by using fixing screws 112 (described later). The substrate 120 is fixed at the main body 21 by using the fixing screws 123.

Through holes 122 are formed at predetermined positions of the substrate 120, and screw holes (not shown) corresponding to the through holes 122 are formed on the back surface of the main body 21. The substrate 120 is fixed at a back surface of the main body 21 by inserting the fixing screws 123 in the through holes 122 to be screwed in screw holes formed in the buck surface of the main body 21.

Electronic assemblies 121 for forming a high frequency communication circuit are mounted on the substrate 120. The substrate 120 is electrically connected with the coils 81A and 81B in the coil units 80A and 80B mounted on a front surface of the main body 21 via the terminals 83.

Therefore, induced electromotive force generated by the coils 81A and 81B is supplied via the terminal 83 to the substrate 120, and the electronic assemblies 121 are operated with the power of the induced electromotive force. When the high frequency communication circuit is operated, for example, the power generation switch 10A transmits radio wave in 2.4 GHz band to an electric apparatus (e.g. light equipment).

As described above, the entire case 20 is formed as a rectangle-shaped chassis when the top cover 22 is mounted on a front side of the main body 21 and the bottom cover 23 is mounted on a back side of the main body 21. Also, in assembling, a lever element 41 of the switch unit 40 is projected from a top surface of the top cover 22 as shown in FIG. 2 and FIG. 3A-FIG. 3C.

A pushing part 49 projected from the top cover 22 of the switch unit 40 is pushed to drive the power generation switch 10A. As described below, in response to the pushing part 49 being further pushed, the induced electromotive force is generated in the coils 81A and 81B, thereby transmitting the radio wave to the electric apparatus, and the like.

In the following, the switch unit 40 will be described.

Figure 8:
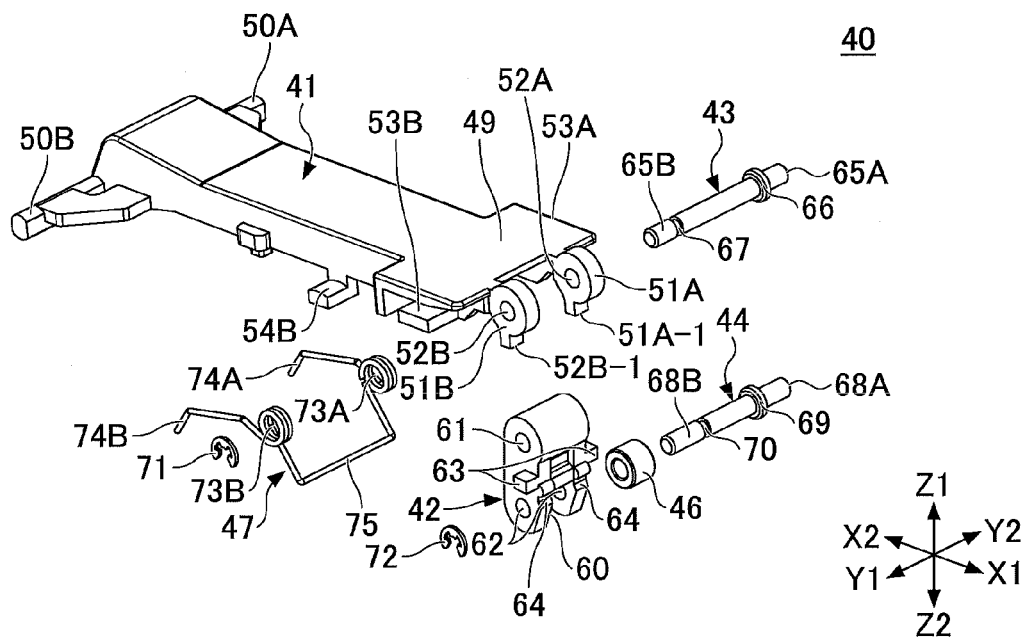
FIG. 8 is an exploded perspective view of the switch unit of the power generation switch.

FIG. 7A, FIG. 7B and FIG. 8 are diagrams illustrating the switch unit 40. The switch unit 40 includes a lever element 41, an operational element 42, a connecting shaft 43, a guiding shaft 44, a roller 46 and a torsion spring 47.

The lever element 41 is a resin molded part in which shaft parts 50A and 50B, shaft bearing parts 51A and 51B, hooking parts 53A and 53B, stoppers 54A and 54B are integrally formed. The lever element 41 is approximately rectangular in a plane view. Additionally, the lever element 41 may not be formed as the resin molded part, and a material thereof may be other than the resin such as metal.

The shaft parts 50A and 50B are formed on one end (end in the direction of arrow X2) of the lever element 41. The shaft parts 50A and 50B are formed projecting outward from a side portion of the lever element 41.

The shaft parts 50A and 50B are held by the shaft receiving parts 30A and 30B formed in the main body 21 when the switch unit 40 is mounted in the main body 21. The switch unit 40 is rotatable in the main body 21 when the shaft parts 50A and 50B are held by the shaft receiving parts 30A and 30B.

The shaft bearing parts 51A and 51B are formed at another end (end in the direction of arrow X1) opposite to the end on which the shaft parts 50A and 50B are formed. The shaft bearing parts 51A and 51B are spaced with each other, and through holes 52A and 52B are respectively formed in the shaft bearing parts 51A and 51B. The connecting shaft 43 that is coupled to the operational element 42 is inserted through the through holes 52A and 52B.

The operational element 42 is a resin molded part in which a roller mounting part 60, a first through hole 61, a second through hole 62, and projections 63 are included. Additionally, the operational element 42 may not be formed as the resin molded part, and a material thereof may be other than the resin such as metal.

In the operational element 42, a roller mounting part 60 and the second through hole 62 are formed in lower side thereof while the first through hole 61 is formed in upper side thereof in FIG. 8.

The roller mounting part 60 is a concave portion in which the roller 46 is mounted. The guiding shaft 44 is inserted through the second through hole 62 after the roller 46 mounted in the roller mounting part 60, thereby coupling the roller 46 to the operational element 42. The roller 46 is formed so that a part of the roller 46 is projected from one end of the operational element 42 when the roller 46 is mounted in the operational element 42.

The operational element 42, configured as described above, is mounted by the shaft bearing parts 51A and 51B formed on the lever element 41, and the operational element 42 is coupled to the lever element 41 by inserting the connecting shaft 43 through the through holes 52A and 52B and the first through hole 61. Thus, when the operational element 42 is coupled to the lever element 41, the operational element 42 is rotatable about the connecting shaft 43 to turn round with respect to the lever element 41 in direction indicated by arrows B1 and B2 shown in FIG. 7A.

The connecting shaft 43 and the guiding shaft 44 include flange parts 66 and 69 and groove parts 67 and 70.

When the connecting shaft 43 is inserted through the through holes 52A and 52B and the first through hole 61, the flange part 66 abuts against a side wall of the shaft baring part 51A while the groove part 67 is at a position outside (in direction of Y1) of the shaft bearing part 51B. A split washer 71 (see FIG. 8) is attached to the groove part 67. Thus, the connecting shaft 43 can be prevented from being slipped off from the lever element 41, thereby preventing the operational element 42 from being separated from the lever element 41.

Further, when the connecting shaft 43 is held by the lever element 41, insertion parts 65A and 65B of the connecting shaft 43 projects outward from the shaft bearing parts 51A and 51B.

Also, when the guiding shaft 44 is inserted through the second through hole 62 and the roller 46, the flange part 69 abuts against a side wall of the operational element 42 while the groove part 70 projects outward from the other side wall of the operational element 42 in the direction Y1. A split washer 72 (see FIG. 8) is attached to the groove part 70. Thus, the guiding shaft 44 can be prevented from being slipped off from the operational element 42, thereby preventing the roller 46 from being separated from the operational unit 42.

Further, when the guiding shaft 44 is held by the operational part 42, engaging parts 68A and 68B corresponding to both ends of the guiding shaft 44 project outward from both side walls of the operational element 42.

In the torsion spring 47, winding parts 73A and 73B, end parts 74A and 74B and a connecting part 75 are integrally formed by using a wire rod for spring. The torsion spring 47, with the operational element 42, is attached to the lever element 41 when the operational element 42 is attached to the lever element 41.

When the torsion spring 47 is attached to the lever element 41, the winding parts 73A and 73B of the torsion spring 47 are inserted in the insertion parts 65A and 65B of the connecting shaft 43. Also, the end part 74A is hooked by the hooking part 53A of the lever element 41 while the end part 74B is hooked by the hooking part 53B. Further, the connecting part 75 is engaged by the groove part 64 formed on the operational element 42.

When the torsion spring 47 is disposed between the lever element 41 and the operational element 42, the torsion spring 47 elastically biases the operational element 42 inward (direction of arrow B2). However, the projections 63 projected toward both side are formed and projections 51A-1 and 52B-1 are formed in lower side (in Z2 direction) of the shaft bearing parts 51A and 51B in the operational element 42. When the projections 63 abut the projections 51A-1 and 52B-1, the operational element 42 is prevented from further pivoting inward (in B2 direction).

When the projections 63 abut the projections 51A-1 and 52B-1, the operational element 42 extends approximately perpendicular to the lever element 41.

The switch unit 40, configured as described above, is mounted on the main body 21 when the shaft parts 50A and 50B of the lever element 41 are held by the shaft receiving parts 30A and 30B of the main body 21. In mounting operation of the switch unit 40 on the main body 21, a coil spring 48 is disposed between a lower surface of the lever element 41 and the main body 21.

The coil spring 48 elastically biases the lever element 41 so as to separate from a bottom surface of the main body 21 by pivoting about the shaft parts 50A and 50B. However, stoppers 54A and 54B are formed at both sides of the lever element 41. When the stoppers 54A and 54B abut back surfaces of the half bodies 22A and 22B, the lever element 41 is prevented from further pivoting.

Figure 11A:
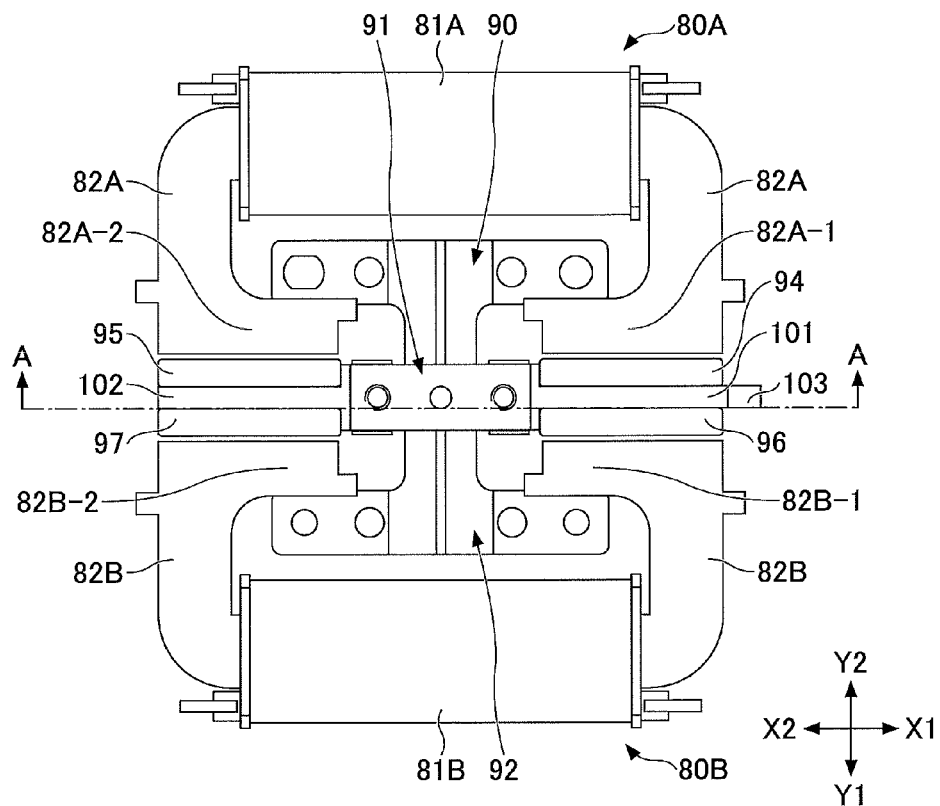
FIG. 11A is a plane view of a coil unit and a magnet unit for illustrating a principal of power generation in the power generation switch.

In the following, the coil units 80A and 80B are described. As shown in FIG. 1, FIG. 5 and FIG. 11A, the coil units 80A and 80B include coils 81A and 81B and cores 82A and 82B. The coils 81A and 81B are formed by winding a cupper line coated by insulating material around a resin holder. Also, the cores 82A and 82B are made of magnetic metal plates whose shape is a part cut ellipse (approximate shape of Ω) in a plane view.

The coils 81A and 81B, the cores 82A and 82B and magnets (MGN and MGS: described below) form a magnetic circuit.

The coil units 80A and 80B are mounted in the coil unit mounting parts 26A and 26B of the main body 21. When being mounted, the coils 81A and 81B are at positions outside the main body 21.

Also, when being mounted, certain portions of the cores 82A and 82B face a magnet unit 90 (described below). Therefore, the magnet unit 90 is disposed between the coil units 80A and 80B.

Additionally, in the descriptions given below, portion of the core 82A of the coil unit 80A, which faces the magnet unit 90 (magnet mounting part 101) may be referred to as facing portions 82A-1 and 82A-2. Also, portion of the core 82B of the coil unit 80B, which faces the magnet unit 90 (magnet mounting part 102) may be referred to as facing portions 82B-1 and 82B-2.

Figure 9:
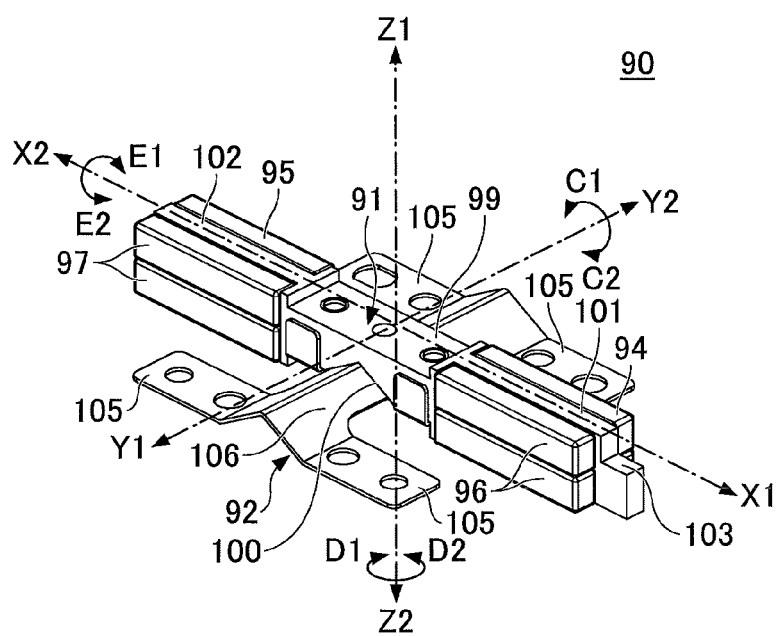
FIG. 9 is a perspective view of a magnet unit of the switch unit.
Figure 10:
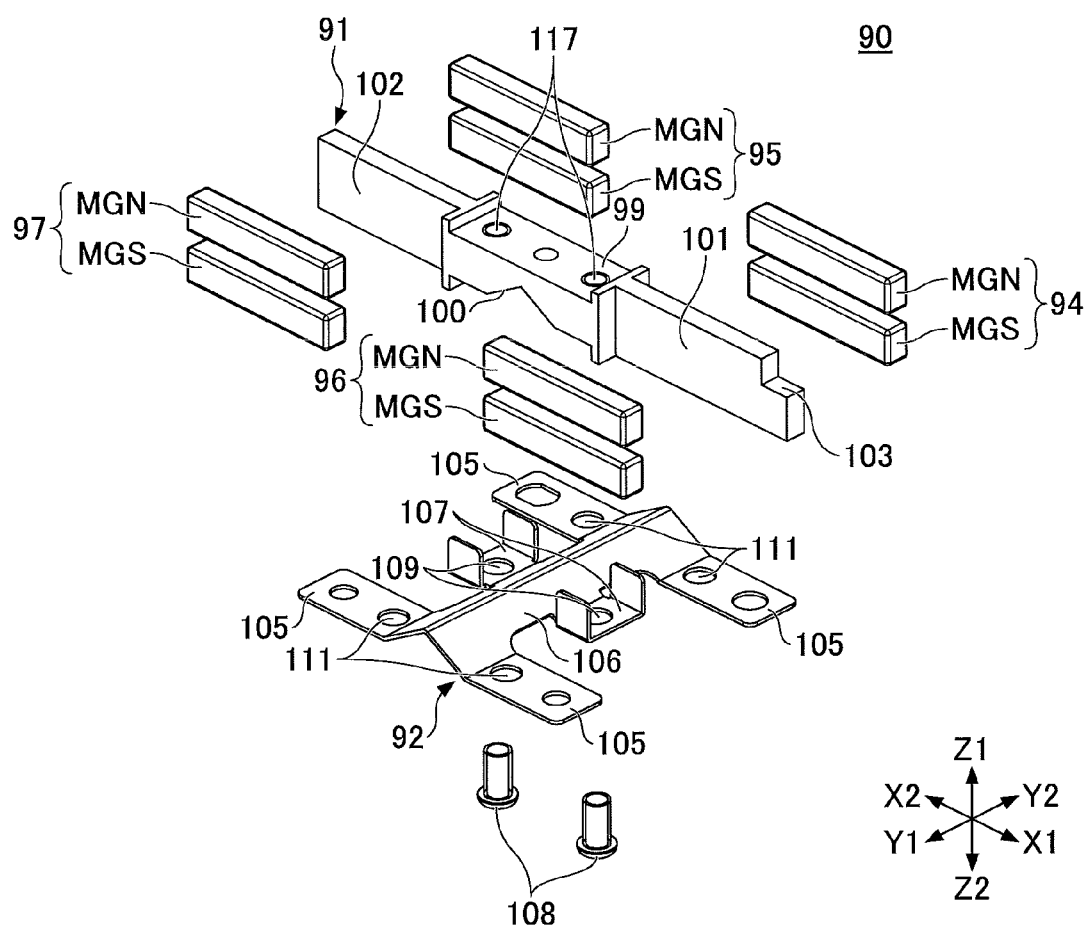
FIG. 10 is an exploded perspective view of the magnet unit.

In the following, the magnet unit 90 will be described. FIG. 9 and FIG. 10 are diagrams illustrating the magnet unit 90. The magnet unit 90 includes a yoke 91, a spring element 92, and magnet pairs 94-97.

The magnet unit 90 is disposed at approximate center of the main body 21, where direction of arrows X1 and X2 corresponds to a longitudinal direction thereof. Also, the magnet unit 90 is disposed in lower side of the disposed switch unit 40.

That is, when the switch unit 40 and the magnet unit 90 are disposed in the main body 21, the switch unit 40 overlaps (disposed at a position in Z1 direction) the magnet unit 90.

The yoke 91 is an approximate prism-shaped element made of magnet metal. A spring fixing part 99 is formed at center of the yoke 91, and magnet mounting parts 101 and 102 are formed at both side of the spring fixing parts 99. In the present embodiment, although, the spring fixing part 99 and the magnet mounting parts 101 and 102 are formed integrally, the spring fixing part 99 may be formed separately from the magnet mounting parts 101 and 102, where the spring fixing part 99 is coupled to the magnet mounting parts 101 and 102.

A triangular concave portion 100 is formed in the spring fixing part 99, where a shape of the triangular concave portion 100 is approximate triangle in a front view (viewed in Y2 direction). Screw holes 117 having certain heights (in Z1-Z2 direction) are formed at both sides of triangular concave portion 100 of the spring fixing part 99.

The magnet mounting parts 101 and 102 are formed so as to extend toward both sides from the spring fixing part 99. The magnet pairs 94-97 are fixed at the magnet mounting parts 101 and 102.

A hook 103 is formed at front end (end in X1 direction) of the magnet mounting part 101. The operational element 42 of the switch unit 40 is engaged with the hook 103. In the present embodiment, the hook 103 is formed as a step portion. However, as described below, the hook 103 may be formed as a different shaped portion as long as it can be engaged with the operational element 42.

The spring element 92 is formed through a pressing operation on a spring plate. In the spring element 92, a base part 105, a triangle spring part 106, a holder part 107 are integrally formed.

The base part 105 is fixed at the main body 21. A pair of base parts 105 is disposed being separated in directions of arrows Y1 and Y2. Through holes 111 are formed in respective base parts 105. Positions of the through holes 111 correspond to the positions of the through holes 32 formed in the main body 21.

The triangle spring part 106 is provided for connecting respective center positions of the pair of the base parts 105. Therefore, in a plane view (viewed in direction of arrow Z1), the base part 105 and the triangle spring part 106 form approximate "H" shape.

A cross section of the triangle spring part 106 is approximately rectangular. The holder parts 107 are formed at center of the triangle spring part 106 extending toward both sides of the triangle spring part 106. Also, through holes 109 are formed in the holder parts 107.

The spring fixing part 99 of the yoke 91 is fixed at the holder part 107. When the yoke 91 is fixed at the spring element 92, the yoke 91 is mounted in the spring element 92 in a manner such that the triangular concave portion 100 and the triangle spring part 106 are engaged with each other, or the spring fixing part 99 is engaged with the holder part 107. When being mounted, the position of the through hole 109 formed in the holder part 107 and the position of the screw hole 117 formed in the spring fixing part 99 coincide.

Then, the fixing screw 108 is inserted from lower side of the holder part 107 penetrating through the through hole 109 and the screw hole 117 formed in the spring fixing part 99. Thus, the yoke 91 is fixed at the spring element 92. When the yoke 91 is fixed at the spring element 92, a longitudinal direction of the yoke 91 is perpendicular to a direction in which the triangle spring part 106 extends.

Additionally, in the descriptions given below, in a case where the switch unit 40 and the magnet unit 90 are mounted in the main body 21, the longitudinal direction (direction of arrows X1 and X2) of the yoke 91 may be referred to as a depth direction, and the direction (direction of arrows Y1 and Y2) in which the triangle spring part 106 extends that is perpendicular to the depth direction may be referred to as width direction and a direction (direction of arrows Z1 and Z2) perpendicular to both the depth direction and the width direction may be referred to as up-down direction.

Specifically, in the depth direction, a direction (direction of X1) toward the hook 103 may be referred to as a forward direction, and a direction (direction of X2) toward the shaft receiving part 30A and 30B may be referred to as a backward direction. Also, in the width direction, a direction (direction of Y2) toward the coil unit 80A may be referred to as a right direction, and a direction (direction of Y1) toward the coil unit 80B may be referred to as a left direction. Further, in the up-down direction, a direction (direction of Z2) in which the lever element 41 is pushed to move may be referred to as a down direction, and a direction (direction of Z1) in which the lever element 41 having been pushed returns in response to release of the pressure may be referred to as up direction.

The magnet pairs 94-97 are formed by a pair of magnets MGN and MGS whose polarities opposite to each other. In the respective magnet pairs 94-97, the magnets MGN and MGS are arranged alongside each other, where the magnet MGN is positioned at a portion in the up direction and the magnet MGS is positioned at a portion in the down direction.

The magnet pair 94 is fixed at a portion in direction of Y2 of the magnet mounting part 101. The magnet pair 95 is fixed at a portion in direction of Y2 of the magnet mounting part 102. The magnet pair 96 is fixed at a portion in direction of Y1 of the magnet mounting part 101. The magnet pair 97 is fixed at a portion in direction of Y1 of the magnet mounting part 102.

For example, the magnet pairs 94-97 are fixed at the magnet mounting parts 101 and 102 by using adhesive agent.

The magnet unit 90 configured as described above is fixed at the main body 21 by using fixing screws 112 and the base element 114 (see FIG. 1).

As shown in FIG. 1, the base element 114 is disposed on the back side surface of the main body 21. The base element 114 is made of metal or resin having strength for holding the magnet unit 90. Screw holes 115 are formed in the base element 114 at positions corresponding to the positions of the through holes 32 and the through holes 111.

When the magnet unit 90 is mounted in the magnet unit mounting part 27 of the main body 21, positions of the through holes 111 formed in the base part 105 and the through holes 32 formed in the main body 21 coincide.

Then, the base element 114 is arranged on the back surface of the main body 21. At this time, the base element 114 is positioned so that the positions of the screw holes 115 formed in the base element 114 coincide with the positions of the through holes 32 and 111 formed in the base part 105.

In this way, positioning of the main body 21, the magnet element 90 and the base element 114 is performed, and the fixing screws 112 penetrate the through holes 32 and 111 and the screw holes 115 (see FIG. 1). Thus, the magnet unit 90 is fixed at the main body 21.

Here, movement of the yoke 91 when the magnet unit 90 is fixed at the main body 21 will be described.

The yoke 91 is attached to the triangle spring part 106 formed in the spring element 92. Also, the triangle spring part 106 extends in the width direction (direction of arrows Y1 and Y2). Therefore, as shown in FIG. 9, the yoke 91 is prevented from rotating (rolling in direction of arrows E1 and E2 shown in FIG. 9) about the axis in the depth direction (direction of arrows X1 and X2), and rotating (yawing in direction of arrows D1 and D2 shown in FIG. 9) about the axis in the up-down direction (direction of arrows Z1 and Z2).

On the other hand, the yoke 91 is allowed to rotate (pitching shown as arrows C1 and C2) about the axis in the width direction (direction of arrows Y1 and Y2) due to elastic deformation of the triangle spring part 106. Hence, the magnet pairs 94-97 arranged on the yoke 91 can also rotate about the axis in the width direction (rotation in direction of arrows C1 and C2).

As described above, the yoke 91, supported by the spring element 92, is rotatable in the direction of arrows C1 and C2 shown in FIG. 9. However, the elastic deformation of the triangle spring part 106 does not occur in a state where the yoke 91 is horizontally placed that is, the yoke 91 is parallel with the bottom surface of the main body 21.

On the contrary, when external force is applied to the yoke 91 to rotate the yoke in the direction of arrow C1 or arrow C2, the elastic deformation of the triangle spring part 106 is caused, and thereby elastic force is accumulated in the triangle spring part 106. The elastic force serves to have the yoke 91 return to a position before rotated.

In the following, the yoke driving mechanism 110 will be described.

The yoke driving mechanism 110 includes an operational element 42 forming a part of the switch unit 40, the erecting walls 28A and 28B and slanted walls 29A and 29B formed in the main body 21.

As shown in FIG. 14A, in the operational element 42, the roller 46 is disposed at a portion in the yoke 91 facing the hook 103. The roller 46 is engaged with the hook 103 of the yoke 91 when the pushing part 49 of the lever element 41 is pushed.

After the operational element 42 is engaged with the hook 103, the yoke 91 rotates in the direction of C1 since the hook 103 is pushed by the operational element 42 in response to further pushing operation of the lever element 41 (see FIG. 16). At this time, in the spring element 92 supporting the yoke 91, the elastic force is accumulated according to the elastic deformation of the triangle spring part 106 due to the rotation of the yoke 91.

As shown in FIG. 14B, the erecting walls 28A and 28B and the slanted walls 29A and 29B are formed so as to engage with the engaging parts 68A and 68B of the guiding shaft 44 formed in the operational element 42.

The erecting walls 28A and 28B extend perpendicular to the bottom surface of the main body 21. Also, the slanted walls 29A and 29B are formed so that widths thereof are gradually increased in the forward direction (direction of X1). The engaging part 68A engages with the erecting wall 28A and the slanted walls 29A, while the engaging part 683 engages with the erecting wall 28B and the slanted walls 29B.

The erecting wall 28A and the slanted wall 29A are sequentially connected, and the erecting wall 28B and the slanted wall 29B are sequentially connected. Therefore, the engaging part 68A moves between the erecting wall 28A and the slanted walls 29A, while the engaging part 68B moves between the erecting wall 28B and the slanted walls 29B.

As describe above, the operational element 42 is biased by the torsion spring 47 in the direction of the arrow B2. Therefore, the engaging parts 68A and 68B are pressed against the erecting walls 28A and 28B and the slanted walls 29A and 29B. Hence, the engaging parts 68A and 68B moves being surely guided by the erecting walls 28A and 28B and the slanted walls 29A and 29B when the operational element 42 is moved in the up-down direction (direction of Z1 and Z2) according to the rotation of the lever element 41.

In a case where the engaging parts 68A and 68B engage with the erecting walls 28A and 28B, the operational element 42 is kept to be approximately perpendicular to the lever element 41. Also, in a case where the operational element 42 is approximately perpendicular to the lever element 41, the roller 46 is kept to be facing the hook 103.

On the other hand, when the operational element 42 moves in the down direction (direction of Z2) while the engaging parts 68A and 68B engage with the slanted walls 29A and 29B, the engaging parts 68A and 68B are guided by the slanted walls 29A and 29B and the engaging parts 68A and 68B are biased in the forward direction (direction of arrow X1) of the main body 21.

As described above, the operational unit 42 is coupled to the lever element 41 through the connecting shaft 43. Therefore, the operational element 42 rotates in direction of arrow B1 shown in FIG. 14B because the guiding shaft 44 is biased in the forward direction of the main body 21.

When the operational element 42 rotates in the direction B1, the roller 46 moves in a direction separating from the hook 103. Upon the operational element 42 rotating in direction of B1, up to a predetermined position, the roller 46 separates from the hook 103. In response to the roller 46 separating from the hook 103, the yoke 91 quickly rotates in the C2 direction due to the elastic force accumulated in the triangle spring part 106.

As described above, in response to a pushing operation of the lever element 41, the yoke driving mechanism 110 have the operational element 42 (roller 46) engage with the yoke 91 to rotate the yoke 91 in the C1 direction, and the yoke driving mechanism 110 have the roller 460 separate from the hook 103 upon the lever element 41 being further pushed to be moved up to the predetermined position, thereby rotating the yoke 91 in the C2 direction.

In the following, a power generation principal of the power generation switch 10A of the present embodiment will be described.

FIG. 11A-FIG. 13B are diagrams illustrating the power generation principal of the power generation switch 10A. In FIG. 11A-FIG. 13B, the coil units 80A and 80B and the magnet unit 90 are shown being enlarged for convenience of explanation.

Figure 11B:
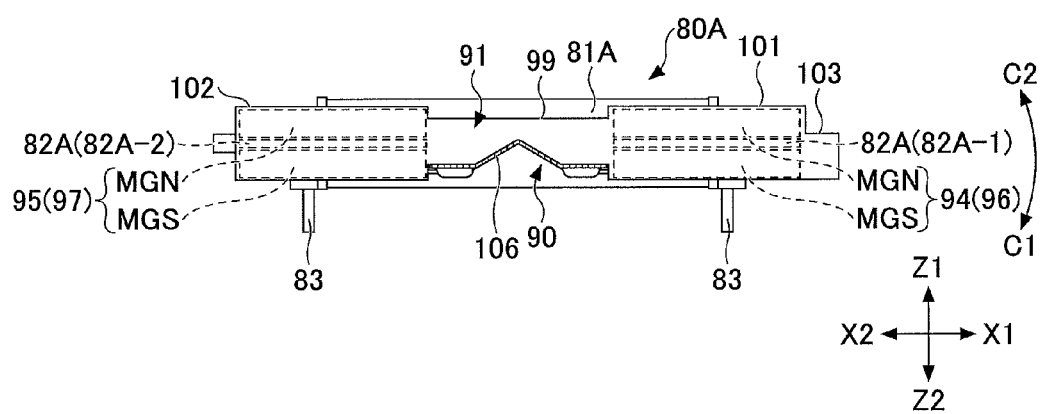
FIG. 11B is a cross sectional view in A-A of FIG. 11A.
Figure 12A:
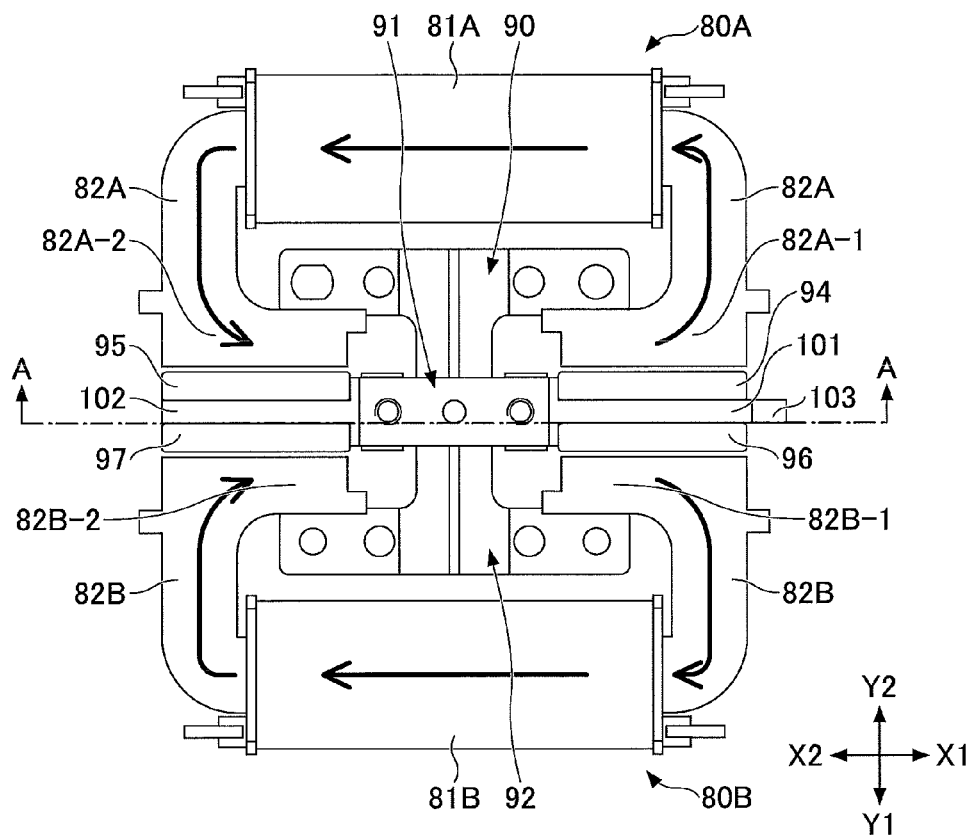
FIG. 12A is another plane view of a coil unit and a magnet unit for illustrating a principal of power generation in the power generation switch.
Figure 12B:
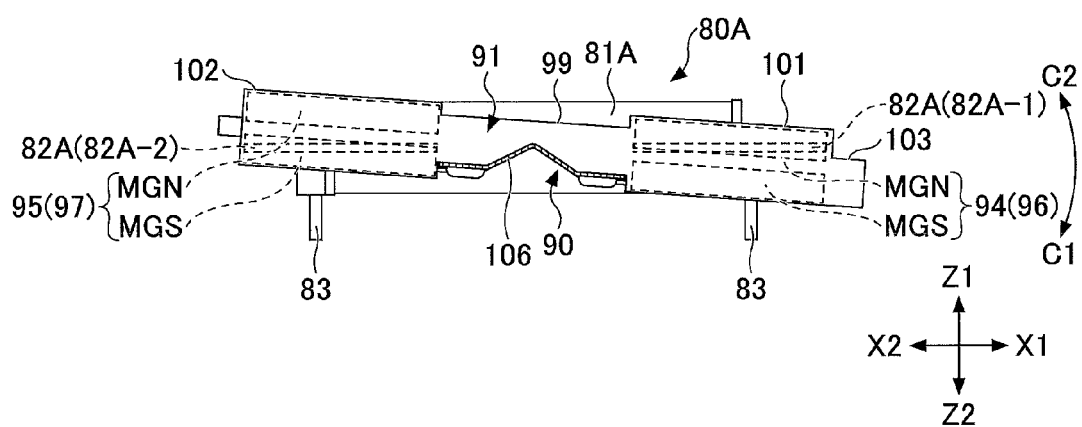
FIG. 12B is a cross sectional view in A-A of FIG. 12A.
Figure 13A:
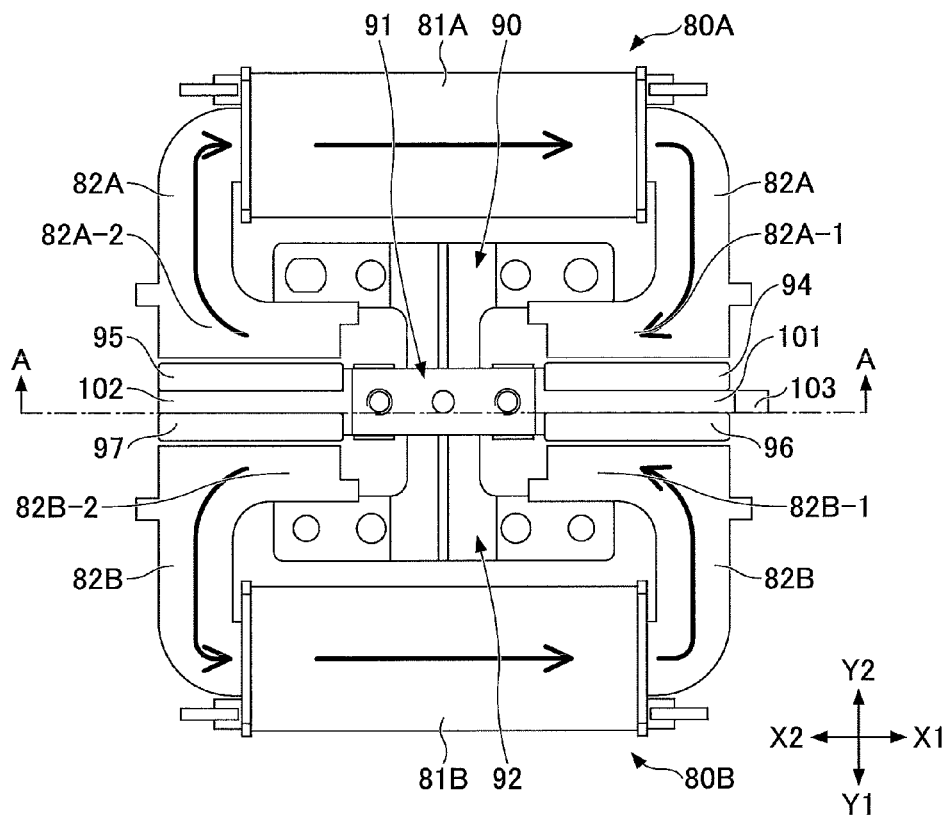
FIG. 13A is another plane view of a coil unit and a magnet unit for illustrating a principal of power generation in the power generation switch.
Figure 13B:
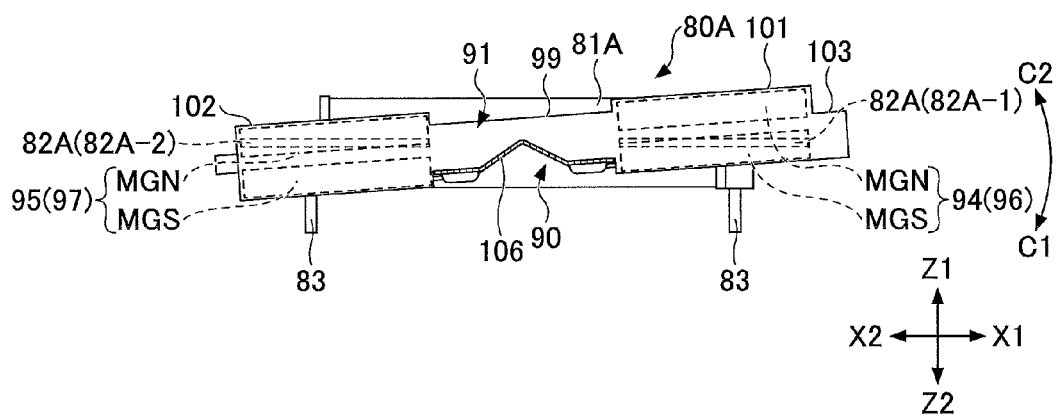
FIG. 13B is a cross sectional view in A-A of FIG. 13A.

Also, FIG. 11A, FIG. 12A and FIG. 13A are plane views of the coil units 80A and 80B and the magnet unit 90, while FIG. 11B, FIG. 12B and FIG. 13B are cross-sectional views in A-A of FIG. 11A, FIG. 12A and FIG. 13A. Therefore, in FIG. 11B, FIG. 12B and FIG. 13B, the magnet pairs 94 and 95 and the core 82A of the coil unit 80A are disposed behind the yoke 91 (magnet pairs 94 and 95 and coil unit 80A are shown with dotted lines).

Additionally, in the power generation switch 10A, operations of the magnet pairs 94 and 95 disposed in right side of the A-A are the same as those of the magnet pairs 96 and 97 disposed in left side of the A-A. Therefore, in FIG. 11B, FIG. 12B and FIG. 13B, the operations of the magnet pairs 94 and 95 are described while descriptions of the operations of the magnet pairs 96 and 97 are omitted (reference numerals related to the magnet pairs 96 and 97 are shown in parentheses in the descriptions).

FIG. 11A and FIG. 11B are diagrams illustrating the coil unit 80A (80B) of the magnet unit 90 before operation. The yoke 91 is placed horizontally in a state before the operation.

Also, in the state before the operation, the facing portion 82A-1 (82B-1) of the core 82A (82B) faces a boundary of the magnets MGN and MGS of the magnet pair 94 (96). Similarly, the facing portion 82A-2 (82B-2) of the core 82A (82B) faces a boundary of the magnets MGN and MGS of the magnet pair 95 (97).

Additionally, a side of the magnet MGN facing the facing portions 82A-1, 82A-2, 82B-1 and 82B-2 is the positive electrode (N). Also, a side of the magnet MGS facing the facing portions 82A-1, 82A-2, 82B-1 and 82B-2 is the negative electrode (S).

FIG. 12A and FIG. 12B are diagrams illustrating the coil unit 80A (80B) of the magnet unit 90 with the hook 103 being pushed to rotate the yoke 91 in a direction of arrow C1 (hereinafter, a state shown in FIG. 12A and FIG. 12B is referred to as an operation state).

When the yoke 91 rotates in the direction of arrow C1, the magnet pairs 94 (96) and 95 (97) fixed at the yoke 91 rotate accordingly. Also, when the yoke 91 rotates in the direction of arrow C1, the elastic deformation of the triangle spring part 106 of the magnet unit 90 occurs, and the elastic force is accumulated.

In the operation state, as shown in FIG. 12B, the magnet MGN of the magnet pair 94 (96) faces the facing portion 82A-1 (82B-1) of the core 82A. Also, the magnet MGS of the magnet pair 95 (97) faces the facing portion 82A-2 (82B-2) of the core 82A.

The polarity of the magnet MGN magnetically connected to the facing portion 82A-1 (82B-1) is opposite to that of the magnet MGS magnetically connected to the facing portion 82A-2 (82B-2). Therefore, magnetic flux from the facing portion 82A-1 (82B-1) to the facing portion 82A-2 (82B-2) is generated in the core 82A (82B) (magnetic fluxes are indicated by thick arrows in FIG. 12A).

Upon a pressure applied to the yoke 91 in the operation state shown in FIG. 12A and FIG. 12B being released, the yoke 91 instantaneously rotates in a direction of arrow C2 according to the elastic force having been accumulated in the triangle spring part 106. When the yoke 91 rotates in the direction of arrow C2, the yoke 91 returns to be in the state before the operation. However, the yoke 91 does not exactly stops at a position corresponding to the state before the operation, but the yoke 91 further rotates in the direction of arrow C2 exceeding the position corresponding to the state before the operation due to inertia force as shown in FIG. 13B (hereinafter the state shown in FIG. 13B is referred to as an over moving state).

In the over moving state, as shown in FIG. 13B, the magnet MGS of the magnet pair 94 (96) faces the facing portion 82A-1 (82B-1) of the core 82A (82B). Also, the magnet MGN of the magnet pair 95 (97) faces the facing portion 82A-2 (82B-2) of the core 82A (82B).

The polarity of the magnet MGS magnetically connected to the facing portion 82A-1 (82B-1) is opposite to that of the magnet MGN magnetically connected to the facing portion 82A-2 (82B-2). Therefore, magnetic flux from the facing portion 82A-2 (82B-2) to the facing portion 82A-1 (82B-1) is generated in the core 82A (82B) (magnetic fluxes are indicated by thick arrows in FIG. 13A).

As described above, in the power generation switch 10A of the present embodiment, a direction of the magnetic flux of the core 82A (82B) in the operation state is opposite to that in the over moving state.

Therefore, in the power generation switch 10A of the present embodiment, upon the pressure applied to the hook 103 being released after the yoke 91 has moved to the position corresponding to the operation state, the yoke 91 instantaneously rotates in the direction of arrow C2 to move to a position corresponding to the over moving state due to the elastic force of the triangle spring part 106. The magnetic flux of the core 82A (82B) is inverted in accordance with the movement of the yoke 91 (magnetic pairs 94-97). Therefore, a significant change of the magnetic flux in the core 82A (82B) occurs, thereby generating the induced electromotive force in the coil 81A (81B) attached to the core 82A (82B).

Additionally, in the present specification, "instantaneous movement of the yoke 91" means the movement of the yoke 91 that can generate the induced electromotive force in the coil 81A (81B).

In the following, operations of the power generation switch 10A based on the aforementioned principal of the power generation will be described.

FIG. 14A-FIG. 19B are diagrams illustrating the operations of the power generation switch 10A. FIG. 14A, FIG. 15A, FIG. 16A, FIG. 17A, FIG. 18A and FIG. 19A are cross sectional views in the depth direction (direction of X1 and X2), while FIG. 14B, FIG. 15B, FIG. 16B, FIG. 17B, FIG. 18B and FIG. 19B are diagrams illustrating operations of the operational element 42 with its enlarged views.

FIG. 14A and FIG. 14B show the power generation switch 10A in the state before the operation.

In the state before operation, the lever element 41 has been moved (turned about the shaft parts 50A and 50B) by the coil spring 48 in a direction (direction of Z1) so as to separate from the bottom of the main body 21. Also, the operational element 42 of the yoke driving mechanism 110 is placed so as to be perpendicular to the lever element 41 and directed downward (direction of Z2).

Further, as shown in FIG. 14A, the roller 46 is separated from the hook 103. Thus, any external force is not applied to the yoke 91, where the yoke 91 is kept to be placed horizontally. Moreover, the elastic deformation of the triangle spring part 106 of the spring element 92 does not occur because the yoke 91 is placed horizontally. Further, as shown in FIG. 14B, the engaging parts 68A and 68B formed at both ends of the guiding shaft 44 engage with the erecting walls 28A and 28B formed in the main body 21.

Upon the user pressing the pushing part 49 of the switch unit 40 of the power generation switch 10A in the state before the operation, the lever element 41 turns downward (direction of Z2) about the shaft parts 50A and 50B. Additionally, in FIG. 14A, the operational force of the user is shown as arrow F.

When the lever element 41 turns, the operational element 42 moves toward the hook 103. According to the movement of the operational element 42, the engaging parts 68A and 68B move downward (direction of Z2) along the erecting walls 28A and 28B. When the engaging parts 68A and 68B move downward (direction of Z2) along the erecting walls 28A and 28B, the operational element 42 stably moves toward the hook 103.

Subsequently, the roller 46 of the operational element 42 engages with the hook 103 in accordance with the movement of the lever element 41. FIG. 15A and FIG. 15B are diagrams illustrating the power generation switch 10A in which the roller 46 engages with the hook 103. In this state, the engaging parts 68A and 68B are kept to be engaged with the erecting walls 28A and 28B.

Upon the user further pressing the pushing part 49, the operational element 42 moves downward (direction of Z2) to be pressed against the hook 103. When the hook 103 is pressed, the yoke 91 rotates in the direction of C1.

In response to the yoke 91 rotating in the direction of C1, the magnetic fluxes shown as thick arrows in FIG. 12A are generated in the cores 82A and 82B. Therefore, the power generation switch 10A is in the operation state.

FIG. 16A, FIG. 16B, FIG. 17A and FIG. 17B are diagrams illustrating the power generation switch 10A in the operation state. Specifically, FIG. 16A and FIG. 16B show the engaging parts 68A and 68B having moved to boundary between the erecting walls 28A and 28B and the slanted walls 29A and 29B.

The erecting walls 28A and 28B extend perpendicularly to the bottom surface of the main body 21. Therefore, the operational element 42 does not rotate about the connecting shaft 43 during the engaging parts 68A and 68B of the guiding shaft 44 move along the erecting walls 28A and 28B, thereby keeping the roller 46 to be engaged with the hook 103.

FIG. 17A and FIG. 17B show the engaging parts 68A and 68B engaging with the slanted walls 29A and 29B.

Upon the lever element 41 being pressed while the engaging parts 68A and 68B engage with the slanted walls 29A and 29B, the engaging parts 68A and 68B are guided by the slopes of slanted walls 29A and 29B. Therefore, the engaging parts 68A and 68B are moved (biased) in the forward direction (direction of X1) of the main body 21.

When the engaging parts 68A and 68B are moved in the forward direction of the main body 21, the operational element 42 rotates in a direction shown as arrow B1, and accordingly the roller 46 separates from the hook 103.

Figure 18A:
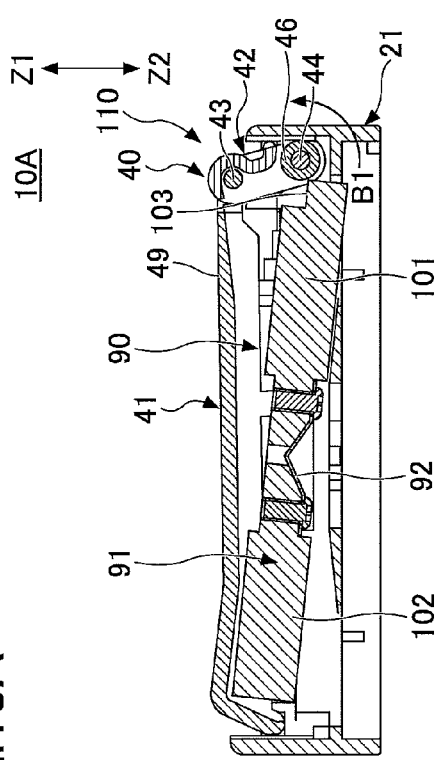
FIG. 18A is another cross sectional view of the power generation switch for illustrating operations thereof.
Figure 18B:
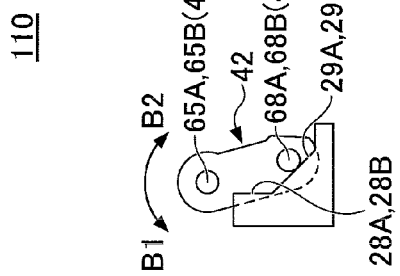
FIG. 18B is an enlarged view of an operational element in FIG. 18A.

FIG. 18A and FIG. 18B show the roller 46 before separating from the hook 103. Upon the lever element 41 shown in FIGS. 18A and 18B being further pressed, the engaging parts 68A and 68B are moved in the forward direction being guided by the slopes of slanted walls 29A and 29B, and the operational element 42 rotates in the direction of B1 accordingly, thereby separating the roller 46 from the hook 103.

Figure 19A:
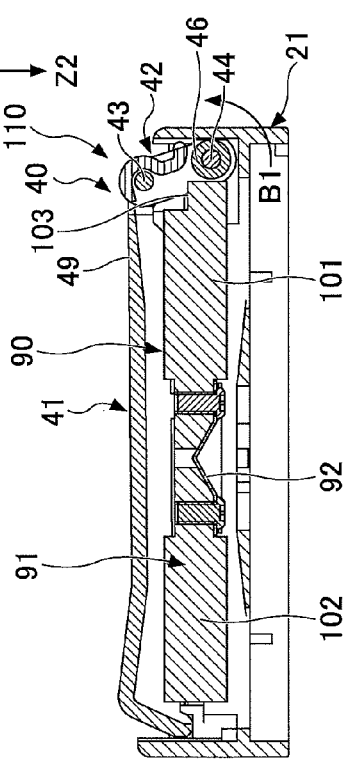
FIG. 19A is another cross sectional view of the power generation switch for illustrating operations thereof.
Figure 19B:
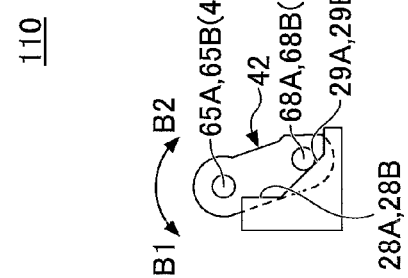
FIG. 19B is an enlarged view of an operational element in FIG. 19A.

FIG. 19A and FIG. 19B show the roller 46 separated from the hook 103.

When the roller 46 is separated from the hook 103, a pressure in the direction of arrow C1 applied to the yoke 91 is released, and the yoke 91 instantaneously rotates in the direction of C2 due to the elastic force accumulated in the triangle spring part 106.

When the yoke 91 rotates in the direction of C2, the magnet MGS of the magnet pairs 94 and 96 face the facing portions 82A-1 and 82B-1 of the cores 82A and 82B as shown in FIG. 13B and the magnet MGN of the magnet pairs 95 and 97 face the facing portions 82A-2 and 82B-2 of the cores 82A and 82B. Thus, the magnetic fluxes shown as thick arrows in FIG. 13A are generated in the cores 82A and 82B, and the power generation switch 10A is in the over moving state.

As described above, the direction of the magnetic fluxes in the cores 82A and 82B in the operation state is opposite to that in the over moving state. Also, the yoke 91 instantaneously moves from the position corresponding to the operation state to the position corresponding to the over moving state due to the elastic force of the triangle spring part 106. Therefore, the significant changes of the magnetic flux in the cores 82A and 82B occur in accordance with the instantaneous movement of the yoke 91, thereby generating the induced electromotive forces in the coils 81A and 81B (power generation is performed).

Additionally, the yoke 91 having moved to the position corresponding to the over moving state returns to the position corresponding to the state before the operation (placed horizontally) due to the elastic force of the spring element 92.

As described above, the power generation switch 10A of the present embodiment generates power by driving the yoke 91, in which the magnet pairs 94-97 are arranged, through the yoke driving mechanism 110. The magnet unit 90 including the yoke 91 and the magnet pairs 94-97 can be more miniaturized and can be made thinner in comparison to a conventional power generator including a motor, etc., and accordingly the power generation switch 10A can be more miniaturized and made thinner.

Also, since the yoke driving mechanism 110 for driving the yoke 91 is formed by the connecting shaft 43 attached to the lever element 41 and the erecting walls 28A and 28B and the slanted walls 29A and 29B that are integrally formed in the main body 21, a number of assemblies can be reduced and a configuration can be simplified, thereby reducing a production cost of the power generation switch 10A.

In the following, the power generation switches 10B and 10C respectively corresponding to a second embodiment and a third embodiment will be described.

Figure 20:
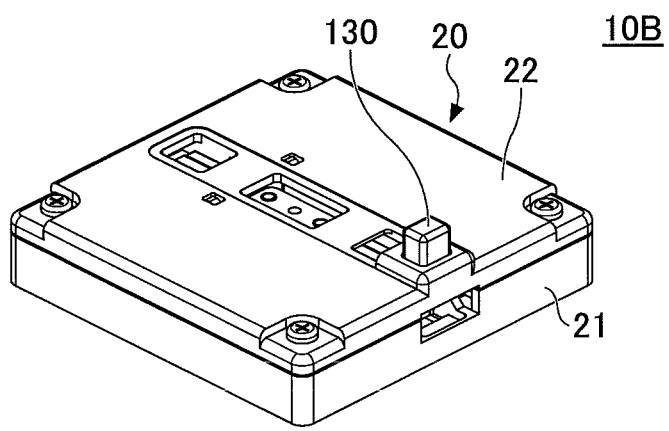
FIG. 20 is a perspective view of the power generation switch of the second embodiment.
Figure 21:
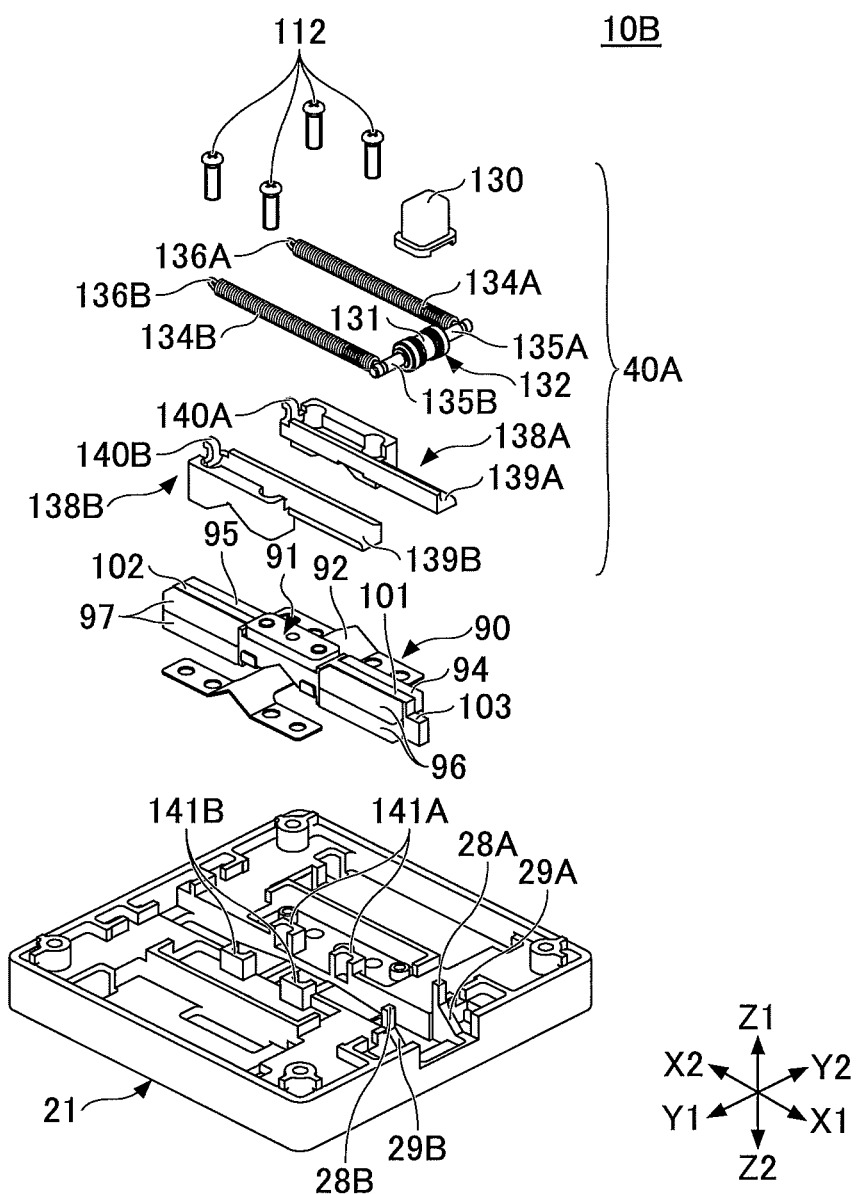
FIG. 21 is an exploded perspective view of the power generation switch of the second embodiment.
Figure 22:
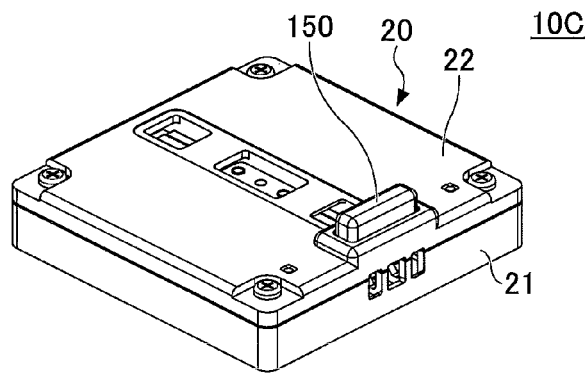
FIG. 22 is a perspective view of the power generation switch of the third embodiment.
Figure 23:
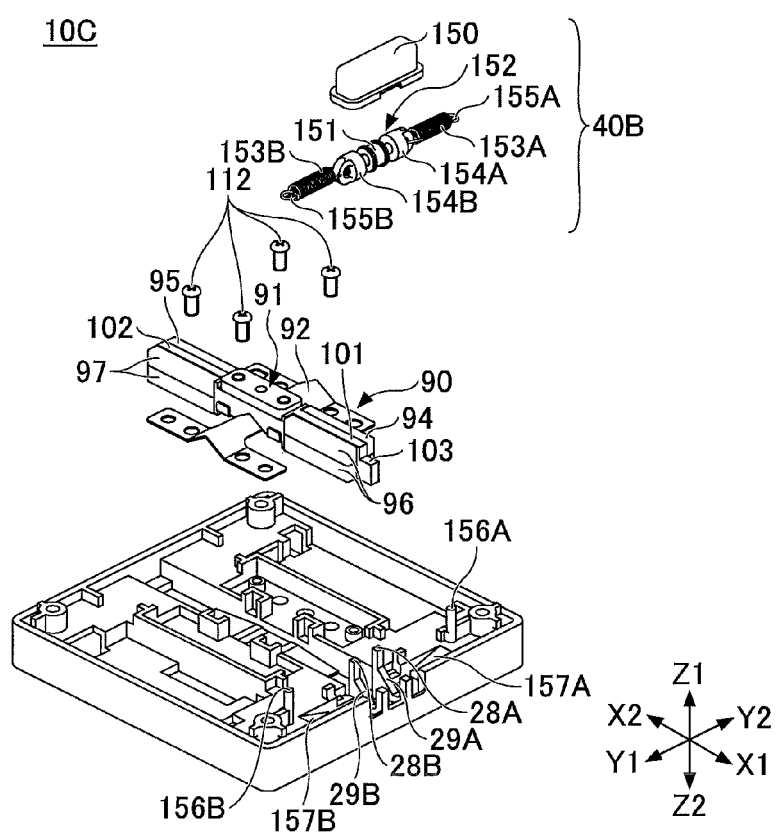
FIG. 23 is an exploded perspective view of the power generation switch of the third embodiment.

FIG. 20 and FIG. 21 are diagrams illustrating the power generation switch 10B corresponding to the second embodiment. Also, FIG. 22 and FIG. 23 are diagrams illustrating the power generation switch 10C corresponding to the third embodiment. Additionally, in FIG. 20-FIG. 23, identical reference numerals will be applied to elements or the like that correspond to those in the embodiment shown in FIG. 1-FIG. 19B, and descriptions thereof may be omitted.

First, the power generation switch 10B of the second embodiment will be described with reference to FIG. 20 and FIG. 21.

FIG. 20 is a perspective view of the power generation switch 10B. FIG. 21 is an exploded perspective view of main parts of the power generation switch 10B. Additionally, the present embodiment is characterized in the switch unit 40A, whereas other elements are configured similarly to the power generation switch 10A of the first embodiment. Therefore, in FIG. 21, mainly elements constituting the switch unit 40A are shown, whereas other elements may be omitted.

The switch unit 40A includes a switch button 130, a roller 131, coil springs 134A and 134B, spring holders 138A and 138B.

The switch button 130 is pressed by the user. Hence, the switch button 130 moves in up-down direction (direction of Z1 and Z2) in the case 20.

The roller 131 is coupled to a guiding shaft 132. The roller 131 is disposed at a center of the guiding shaft 132, where both sides of the guiding shaft 132 respectively form engaging parts 135A and 135B that engage with the erecting walls 28A and 28B and the slanted walls 29A and 29B. Further, front ends (ends placed in direction of X1) of the coil springs 134A and 134B are connected with the both ends of the guiding shaft 132.

The coil springs 134A and 134B extend in the depth direction (direction of X1 and X2). The coil springs 134A and 134B are held in the spring holders 138A and 138B.

Spring mounting parts 139A and 139B extending in the depth direction are formed in the spring holders 138A and 138B. Also, claw parts 140A and 140B are formed at a portion in the backward direction of the spring mounting parts 139A and 139B.

When the coil springs 134A and 134B are held in the spring holders 138A and 138B, the coil springs 134A and 134B are respectively mounted on the spring mounting parts 139A and 139B. Edge portions 136A and 136B of the coil springs 134A and 134B are locked by the claw parts 140A and 140B. Further, the guiding shaft 132 connected with the front ends of the coil springs 134A and 134B is placed at a portion in forward direction (direction of X1) of the spring mounting parts 139A and 139B when the respective elements are assembled.

A pair of the spring holders 138A and 138B is mounted in the main body 21, where the magnet unit 90 is placed between the spring holders. When the spring holders 138A and 138B are mounted in the main body 21, the roller 131 faces the hook 103 and the engaging parts 135A and 135B engage with the erecting walls 28A and 28B. Further, when the top cover 22 is mounted on the main body 21, the switch button 130 engage with the engaging parts 135A and 135B.

In the power generation switch 10B of the present embodiment, upon the switch button 130 being pressed, the switch button 130 presses the engaging parts 135A and 135B downwards. Thus, the guiding shaft 132 expands the coil springs 134A and 134B while it moves downward (in direction of Z2). At this time, elastic force is accumulated in the coil springs 134A and 134B due to the expansion thereof.

In response to the switch button 130 being pressed, the roller 131 moves downward. At this time, the guiding shaft 132 is pressed against the erecting walls 28A and 28B due to the elastic force of the coil springs 134A and 134B. Therefore, the engaging parts 135A and 135B of the guiding shaft 132 are moved and kept to be engaged with the erecting walls 28A and 28B. Hence, the roller 131 can be moved stably toward the hook 103.

In response to the switch button 130 being pressed, the roller 131 abuts the hook 103 and presses the hook 103 downward. Thus, the yoke 91 in the state before the operation starts to rotate, and the power generation switch 10B is transitioned into the operation state.

In response to the switch button 130 being further pressed, the engaging parts 135A and 135B are engaged with the slanted walls 29A and 29B according to the downward movement of the guiding shaft 132. Therefore, the roller 131 is moved (biased) in forward direction (direction of X1) because the engaging parts 135A and 135B are guided by the slopes of slanted walls 29A and 29B.

When the switch button 130 is pressed further, the roller 131 separates from the hook 103. Thus, the yoke 91 instantaneously moves to the position corresponding to the over moving state due to the elastic force accumulated in the spring element 92, and the power generation is performed in the coil units 80A and 80B. Then, the roller 131 moves to the position corresponding to the state before the operation due to the elastic force accumulated in the coil springs 134A and 134B.

In the power generation switch 10B of the second embodiment, only the switch button 130 projects from the top cover 22. Therefore, a compact configuration of the power generation switch 10B, especially in top surface of the top cover 22, can be achieved.

In the following, the power generation switch 100 corresponding to the third embodiment will be described with reference to FIG. 22 and FIG. 23.

FIG. 22 is a perspective view of the power generation switch 100. FIG. 23 is an exploded perspective view of main parts of the power generation switch 100. Additionally, the present embodiment is characterized in the switch unit 40B, whereas other elements are configured similarly to the power generation switch 10A of the first embodiment. Therefore, in FIG. 23, mainly elements constituting the switch unit 40B are shown, whereas other elements may be omitted.

The switch unit 40B includes a switch button 150, a roller 151, a roller holding element 152 and coil springs 153A and 153B.

Similarly to the second embodiment, the switch button 150 is pressed by the user and moves up-down direction (in direction of Z1 and Z2).

The roller 151 is coupled to the roller holding element 152. The roller 151 is disposed at a center of the roller holding element 152. Both sides of a roller holding portion of the roller holding element 152 respectively form engaging parts 154A and 154B. The engaging parts 154A and 154B engage with the erecting walls 28A and 28B and the slanted walls 29A and 29B as well as the switch button 150.

Also, both ends of the roller holding element 152 are connected with one side ends of the coil springs 153A and 153B. In the present embodiment, the coil springs 153A and 1533 extend in left-right direction (direction of Y1 and Y2).

A left side (direction of Y1) end of the coil spring 153A is connected with the roller holding element 152, while a right side (direction of Y2) end 155A thereof is connected with a mounting pin 156A disposed in the main body 21. Also, a right side (direction of Y2) end of the coil spring 153B is connected with the roller holding element 152, while a left side (direction of Y1) end 155B is connected with a mounting pin 156B disposed in the main body 21.

Further, a groove part 157 is formed at a portion of the main body 21 facing the roller holding element 152 and the coil springs 153A and 153B. The roller holding element 152 and the coil springs 153A and 153B are configured to be inserted in the groove part 157 according to movement of the roller 151 (described below).

When the switch unit 40B is mounted in the main body 21, the roller 151 faces the hook 103 of the yoke 91, the roller holding element 152 and the coil springs 153A and 153B face the groove part 157, and the engaging part 154A and 154B engage with the erecting walls 28A and 28B.

The roller holding element 152 and the coil springs 153A and 153B are arranged along an approximate straight line. When the switch unit 40B is mounted in the main body 21, the roller holding element 152 and the coil springs 153A and 153B are adjacent to a front side wall of the main body 21.

The mounting pins 156A and 156B are formed at positions deviated from positions of the erecting walls 28A and 28B and the slanted walls 29A and 29B in the backward direction (direction of X2). Also, upon the switch unit 40B being mounted in the main body 21, the coil springs 153A and 153B are slightly expanded to generate the elastic force.

Therefore, when the switch unit 40B is mounted in the main body 21, the engaging parts 154A and 154B are pressed against the erecting walls 28A and 28B due to the elastic force of the coil springs 153A and 153B.

In the power generation switch 10C of the present embodiment, in response to pressing the switch button 150, the switch button 150 presses the engaging parts 154A and 154B downward. Thus, the roller holding element 152 moves downward (direction of Z2) while the moving roller holding element 152 expands the coil springs 153A and 153B. At this time, the elastic force is accumulated in the coil springs 153A and 153B due to the expansion thereof.

When the roller holding element 152 moves downward, the roller 151 abuts the hook 103 and presses the hook 103 downward. Thus, the yoke 91 in the state before the operation starts to rotate, and the power generation switch 10C is transitioned into the operation state.

In response to the switch button 150 being further pressed, the engaging parts 154A and 154B engage with the slanted walls 29A and 29B in accordance with the downward movement of the roller holding element 152. Therefore, the roller 151 is moved (biased) in forward direction (direction of X1) because the engaging parts 154A and 154B are guided along the slope of the slanted walls 29A and 29B.

When the switch button 150 is further pressed, the roller 151 separates from the hook 103. Thus, the yoke 91 instantaneously moves from the position corresponding to the operation state to the position corresponding to the over moving state, and the power generation is performed in the coil units 80A and 80B. Then, the roller 151 moves to the position corresponding to the state before the operation due to the elastic force accumulated in the spring element 92.

Additionally, when the switch button 150 is pressed to have the roller 151 separate from the hook 103, the roller holding element 152 and the coil springs 153A and 153B are inserted in the groove part 157 formed in the main body 21. Therefore, the roller 151 can be surely moved up to a position at which the roller 151 separates from the hook 103.

As described above, similarly to the power generation switch 10B of the second embodiment, in the third embodiment, only the switch button 150 projects from the top cover 22. Therefore, a compact configuration of the power generation switch 100, especially in top surface of the top cover 22, can be achieved.

Also, in the power generation switch 100 of the third embodiment, since the spring holders 138A and 138B used in the power generation switch 10B of the second embodiment are not required, a number of assemblies can be reduced.

Further, since the roller holding element 152 and the coil springs 153A and 153B are arranged adjacent to the front side wall of the main body 21, mounting space of the switch unit 40B in the main body 21 can be reduced.

Although the invention has been described with respect to example embodiments for a complete and clear disclosure, the appended claims are not to be limited to the described embodiments but are to be construed as embodying all modifications and alternative constructions that may occur to one skilled in the art that fairly fall within the basic teaching set forth herein.

For example, in the first embodiment, although the roller 46 is disposed at a position where the operational element 42 engage with the hook 103, the operational element 42 may be directly engage with the hook 103 without disposing the roller 46. In this case, a shape of a portion of the operational element 42 for engaging with the hook 103 may be spherical, curved, slanted, etc., so as to improve the engagement performance of the operational element 42 and the hook 103.

What is claimed is:

1. A power generation switch comprising:
    a case;
    a core, a coil being wound around the core;
    a magnet magnetically connected with the core;
    a yoke in which the magnet is disposed;
    an elastic element that supports the yoke and elastically deforms so as to deviate a position of the magnet from the core;
    a switch element that is operated to be moved; and
    a yoke driving mechanism that moves the yoke so that upon an engagement of the switch element and the yoke being released, the yoke moves between a first position and a second position due to elastic force of the elastic element, wherein first magnetic flux is generated by the core and the magnet when the yoke is at the first position and second magnetic flux different from the first magnetic flux is generated by the core and the magnet when the yoke is at the second position, wherein
    the yoke driving mechanism includes
    an operational element provided in the switch element and configured to be able to move and engage with the yoke, and
    a biasing element configured to bias the operational element so as to separate from the yoke upon the yoke moving to the second position; wherein the biasing element is a slanted wall formed in the case.

2. The power generation switch according to claim 1, wherein the operational element includes a roller disposed at a position at which the yoke and the operational element engage.

* * * * *